United States Patent
Petill et al.

(10) Patent No.: US 9,858,718 B2
(45) Date of Patent: Jan. 2, 2018

(54) DYNAMICALLY ADAPTABLE VIRTUAL LISTS

(71) Applicant: Microsoft Technology Licensing, LLC, Redmond, WA (US)

(72) Inventors: Scott Petill, Seattle, WA (US); Shih-Sang Carnaven Chiu, Seattle, WA (US); Ikuyo Tsunoda, Seattle, WA (US); Jonathan Eric Foster, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 139 days.

(21) Appl. No.: 14/606,974

(22) Filed: Jan. 27, 2015

(65) Prior Publication Data

US 2016/0217612 A1 Jul. 28, 2016

(51) Int. Cl.
*G06T 19/00* (2011.01)
*G06T 7/40* (2017.01)
(Continued)

(52) U.S. Cl.
CPC ........ *G06T 19/006* (2013.01); *G02B 27/0172* (2013.01); *G06F 3/011* (2013.01); *G06F 3/0482* (2013.01); *G06F 3/04815* (2013.01); *G06K 9/6201* (2013.01); *G06T 3/40* (2013.01); *G06T 7/40* (2013.01); *G06T 7/70* (2017.01); *G06T 11/60* (2013.01); *G02B 2027/0178* (2013.01)

(58) Field of Classification Search
None
See application file for complete search history.

(56) References Cited

U.S. PATENT DOCUMENTS

| 6,295,059 B1 | 9/2001 | Lentz et al. |
| 6,377,284 B1 | 4/2002 | Lentz et al. |

(Continued)

OTHER PUBLICATIONS

ISA European Patent Office, International Search Report and Written Opinion issued in PCT Application No. PCT/US2016/013498, dated Apr. 26, 2016, WIPO, 14 pages.

(Continued)

*Primary Examiner* — James A Thompson
(74) *Attorney, Agent, or Firm* — Alleman Hall Creasman & Tuttle LLP

(57) ABSTRACT

Examples are disclosed that relate to displaying lists on augmented reality and virtual reality display devices in such a manner as to avoid list occlusion and resulting user input errors. One disclosed example provides a computing device including an image sensor, a display device, a logic device configured to execute instructions, and a storage device comprising instructions executable by the logic device. The instructions are executable to generate a representation of the list, compare the representation of the list to a topology of a three-dimensional environment viewable via the display device to determine whether the representation of the list intersects any object in the topology, and if the representation of the list intersects an object in the topology of the three-dimensional environment, then adjust one or more of a position and orientation of each of one or more items of the list to adapt to the object in the topology.

20 Claims, 7 Drawing Sheets

(51) Int. Cl.
| | |
|---|---|
| *G06T 11/60* | (2006.01) |
| *G06T 3/40* | (2006.01) |
| *G06K 9/62* | (2006.01) |
| *G02B 27/01* | (2006.01) |
| *G06F 3/01* | (2006.01) |
| *G06F 3/0481* | (2013.01) |
| *G06F 3/0482* | (2013.01) |
| *G06T 7/70* | (2017.01) |

(56) References Cited

U.S. PATENT DOCUMENTS

| | | |
|---|---|---|
| 6,636,246 B1 | 10/2003 | Gallo et al. |
| 6,880,132 B2 | 4/2005 | Uemura |
| 7,562,312 B2 | 7/2009 | Rochford et al. |
| 8,065,603 B2 | 11/2011 | Gossweiler et al. |
| 8,732,597 B2 | 5/2014 | Ludolph et al. |
| 2005/0149977 A1 | 7/2005 | Nakamura et al. |
| 2009/0070711 A1 | 3/2009 | Kwak et al. |
| 2011/0225545 A1 | 9/2011 | Horodezky et al. |
| 2011/0304608 A1 | 12/2011 | Yang |
| 2012/0144342 A1 | 6/2012 | Yu et al. |
| 2012/0159393 A1 | 6/2012 | Sethi |
| 2012/0210214 A1 | 8/2012 | Yoo et al. |
| 2013/0016070 A1* | 1/2013 | Starner ............... G02B 27/017 345/175 |
| 2014/0184496 A1* | 7/2014 | Gribetz ............... G02B 27/017 345/156 |
| 2014/0333666 A1 | 11/2014 | Poulos et al. |
| 2015/0007114 A1* | 1/2015 | Poulos .................... G06F 3/012 715/852 |

OTHER PUBLICATIONS

IPEA European Patent Office, Second Written Opinion Issued in PCT Application No. PCT/US2016/013498, dated Jul. 20, 2016, WIPO, 10 pages.

IPEA European Patent Office, International Preliminary Report on Patentability Issued in PCT Application No. PCT/US2016/013498, dated Mar. 23, 2017, WIPO, 10 Pages.

Honcheng, "PaperFold for iOS", Published on: Aug. 31, 2013, Available at: https://github.com/honcheng/PaperFold-for-iOS.

Honcheng, "PaperFoldGallery", Published on: Jun. 12, 2013, Available at: https://github.com/honcheng/PaperFoldGallery.

Niklas, Felix, "Paperfold CSS", Published on: Mar. 31, 2012, Available at: https://developer.mozilla.org/en-US/demos/detail/paperfold-css.

"Stunning Resources for Paper Folding Animation Effect", Published on: Mar. 28, 2013, Available at: http://www.awwwards.com/stunning-resources-for-paper-folding-animation-effect.html.

Motisan, Radu, "A 3D Carousel View for Android", Published on: Jun. 13, 2013, Available at: http://www.pocketmagic.net/2013/06/a-3d-carousel-view-for-android/#.VGXs7bWcU5A.

"3D Contacts List", Retrieved Date: Nov. 14, 2014, Available at: https://play.google.com/store/apps/details?id=com.contacts.list.rotate.sms.colored.phonebook.free.

* cited by examiner

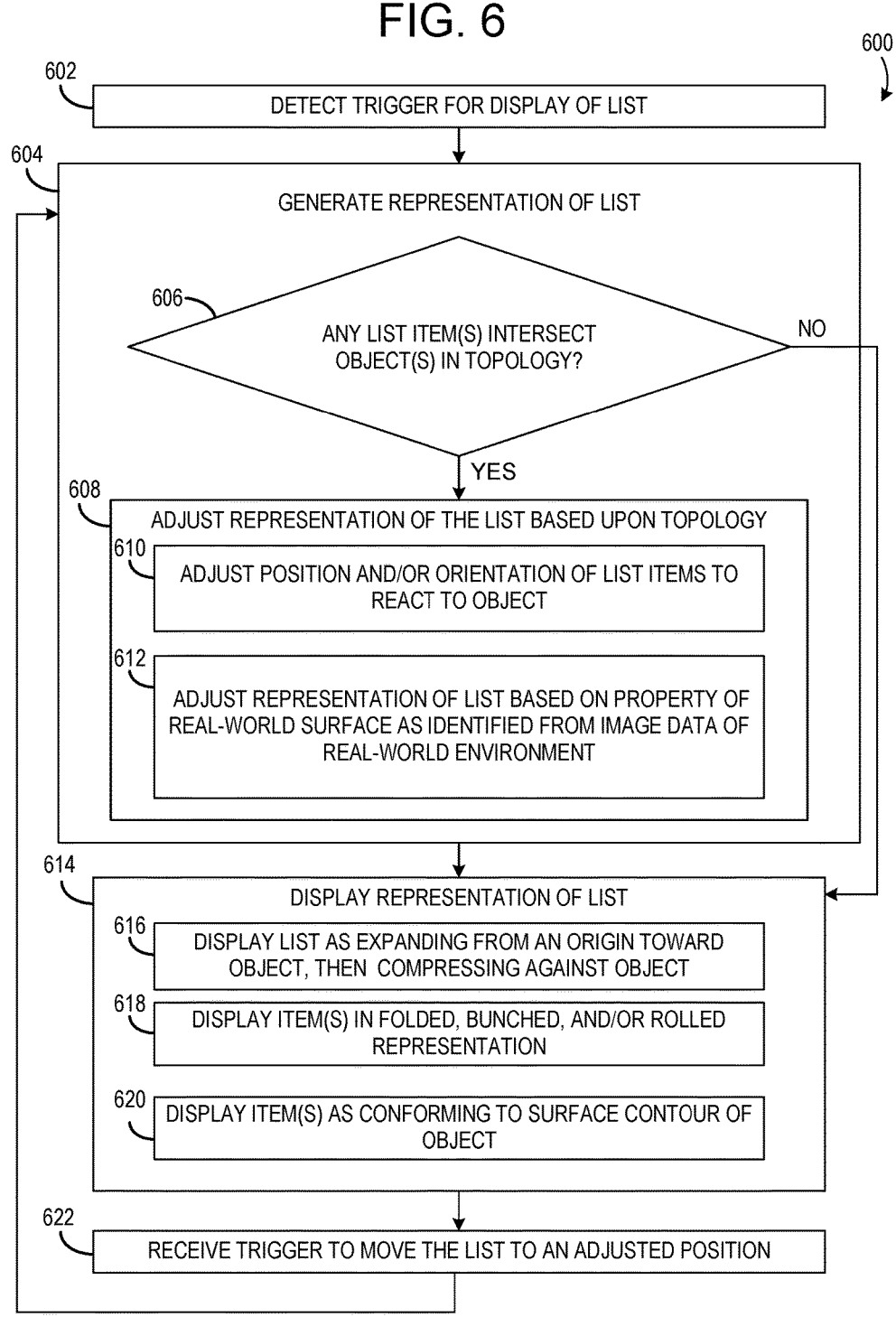

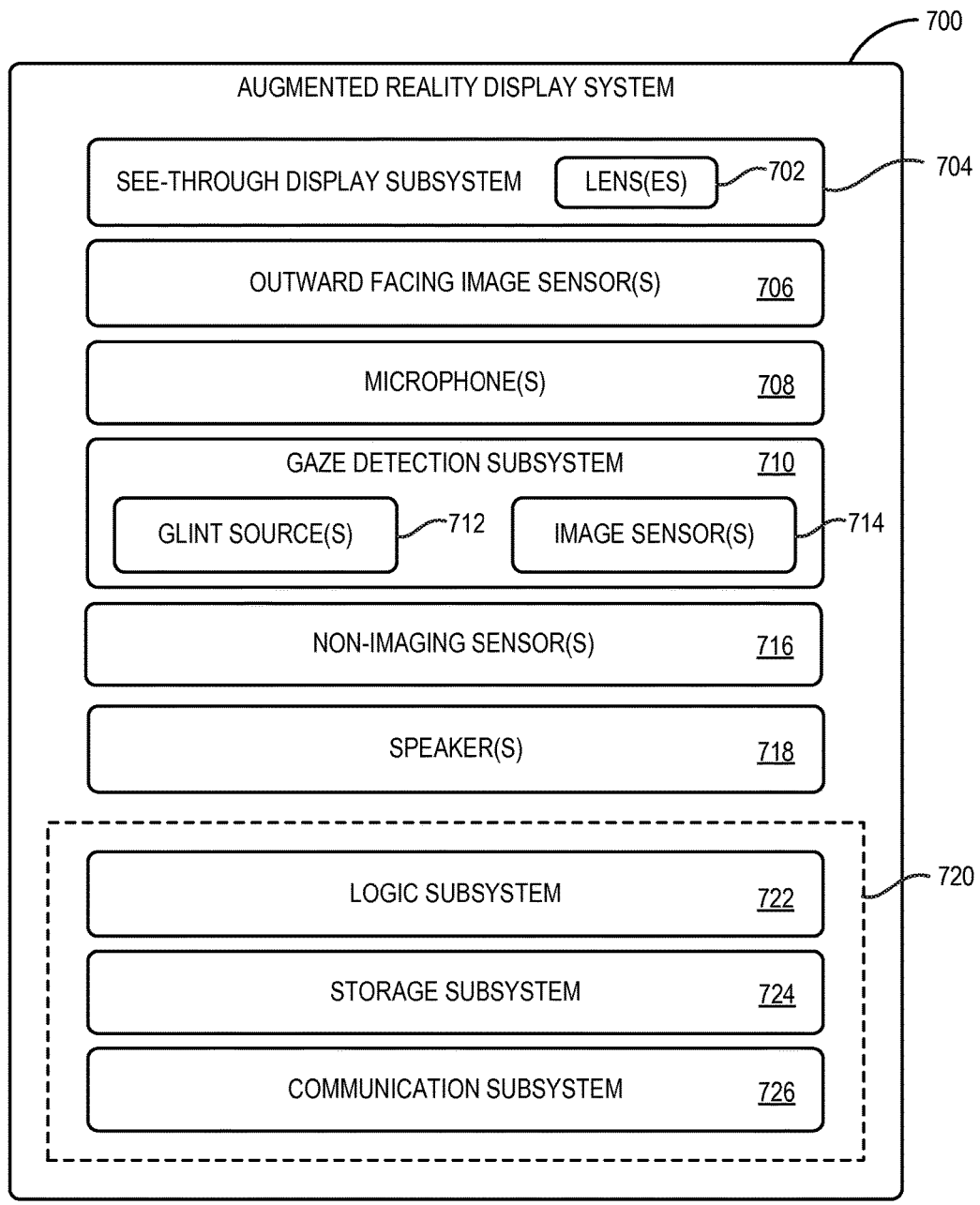

DYNAMICALLY ADAPTABLE VIRTUAL LISTS

BACKGROUND

Display technologies may allow a user to experience immersive virtual environments and/or a mix of real and virtual environments. For example, some computing devices may include see-through displays that allow the presentation of augmented reality imagery via the display of virtual objects superimposed over a real-world environment.

SUMMARY

Examples are disclosed that relate to displaying lists on augmented reality and virtual reality display devices in such a manner as to avoid list occlusion and resulting user input errors. One disclosed example provides a computing device including an image sensor, a display device, a logic device configured to execute instructions, and a storage device comprising instructions executable by the logic device. The instructions are executable to generate a representation of the list, compare the representation of the list to a topology of a three-dimensional environment viewable via the display device to determine whether the representation of the list intersects any object in the topology, and if the representation of the list intersects an object in the topology of the three-dimensional environment, then adjust one or more of a position and orientation of each of one or more items of the list to adapt to the object in the topology.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 6 shows a flow diagram illustrating an example method of displaying a dynamically adaptable virtual list.

FIG. 7 shows a block diagram of an example augmented reality display system.

DETAILED DESCRIPTION

As mentioned above, display device technologies may enable the presentation of virtual reality and augmented reality three-dimensional (3D) environments. Various types of virtual objects may be displayed in such environments, including but not limited to interactive user interface elements, such as interactive lists.

However, displaying virtual lists in a 3D setting may pose various challenges. For example, a list displayed as a flat, two-dimensional object may converge away from a viewer's position, which may make it difficult for a user to read and interact with the list. On the other hand, a list displayed as a three-dimensional object within the virtual or augmented reality environment may occupy a large amount of visual space, and thus may encroach or overlap with other real or displayed objects in the 3D world. This may result in occlusion of portions of the list by other objects in the environment.

Accordingly, examples are disclosed herein that relate to displaying dynamically adaptable virtual lists that adapt to a topology of a 3D virtual and/or augmented reality environment. Such lists may be displayed in a variety of forms and spatial layouts that adapt to other virtual and/or real-world elements, and thus may provide for more realistic and immersive augmented and/or virtual reality experiences.

Figure 1:
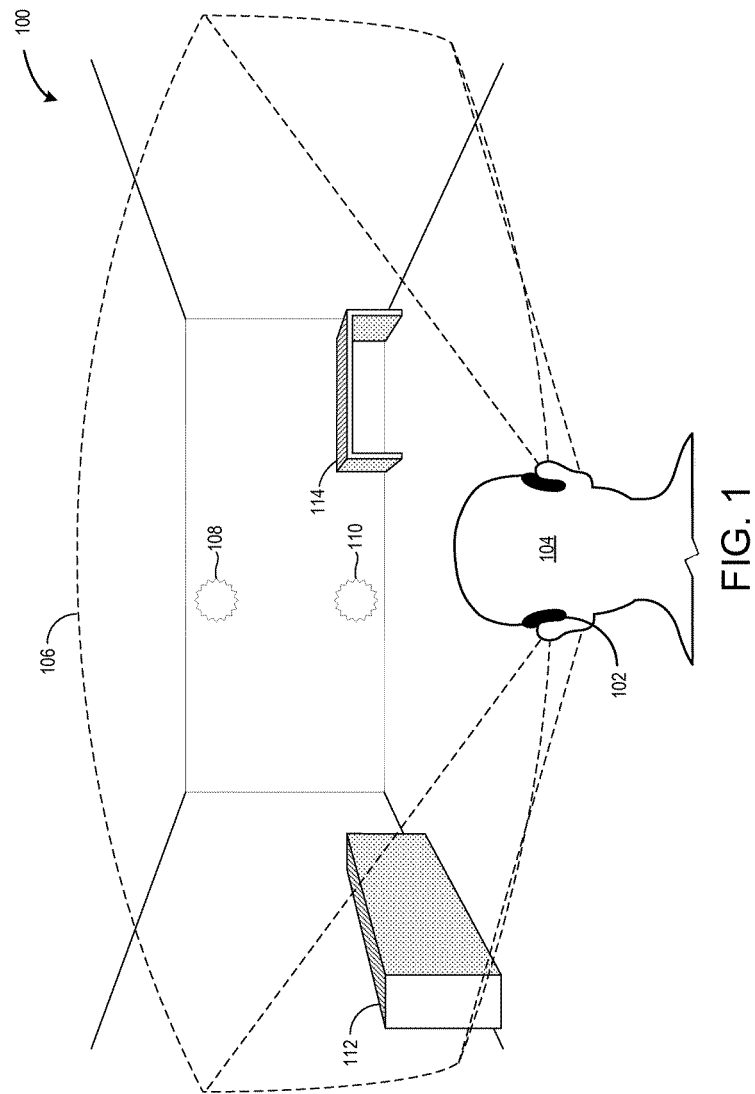
FIG. 1 shows an example augmented reality display device in an example use environment.

FIG. 1 shows an example use environment 100 in which an example display device 102 is worn by a user 104. The display device 102 is depicted as a head-mounted display device for the presentation of a 3D augmented reality experience. A surrounding environment is viewable through the display device 102, as indicated schematically via field of view 106. The 3D environment may include a variety of virtual objects displayable with real-world surfaces and objects, shown here as virtual objects 108, 110 and real-world objects 112, 114. While shown in FIG. 1 as an augmented reality head-mounted display device, it will be understood that a display device according to the present disclosure may take any suitable form, including but not limited to other types of wearable display devices, non-wearable display devices, mobile display devices, holographic projectors, devices having or configured to connect to one or more display(s), and/or any other device configured to display 3D virtual content to a viewer. Such display devices may or may not include a see-through display, and may be configured to display a completely virtual environment to the user 104.

Figure 2:
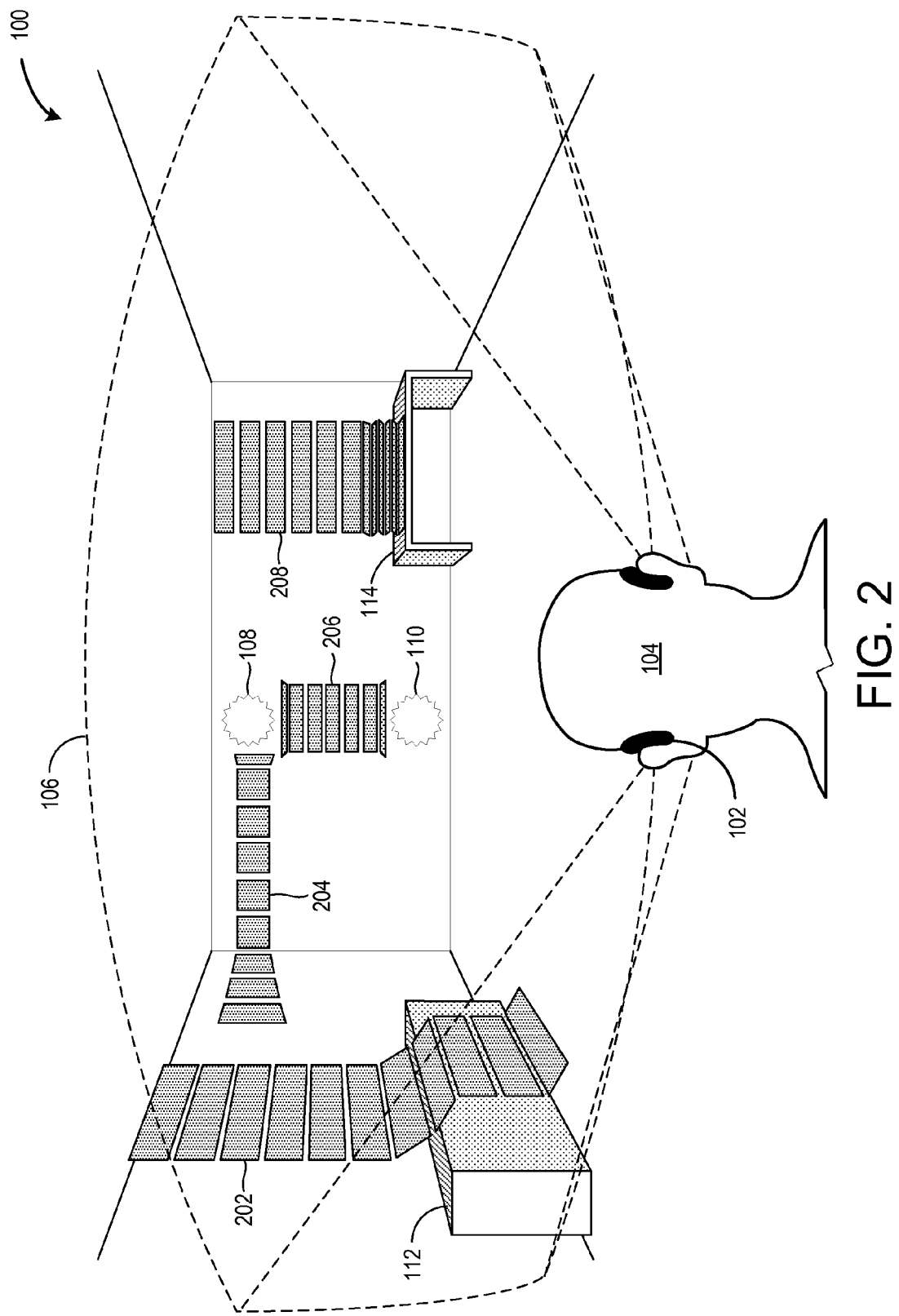
FIG. 2 shows example dynamically adaptable virtual lists in the use environment of FIG. 1.

FIG. 2 shows various examples of dynamically adaptable virtual lists 202, 204, 206, and 208 displayed via the display device 102 within environment 100. First, list 202 is displayed as vertically unfolded and conforming to topologies of a real-world wall, the real-world object 112, and a real-world floor. The unfolding list may be displayed as obeying physical laws (e.g. laws of motion, gravity, etc.), such that it adapts to the real-world object 112 by being displayed as draping or otherwise flowing over the real-world object 112.

Next, list 204 is shown as horizontally unfolded and conforming to the side wall and the back wall, as well as adapting to the virtual object 108 by folding or otherwise compressing at the virtual object 108. Additionally, list 206 is displayed as adapting to both virtual objects 108 and 110. List 208 is shown as conforming to the back wall and adapted to the real-world object 114. However, instead of flowing or draping over the real-world object 114, a portion of the list 208 is folded or otherwise compressed as it nears the real-world object 114.

When the display of a list is triggered, a dynamically adaptable virtual list may displayed via animation as expanding from an origin, such as a default location or a location indicated by the user 104. All items in a list may be initially revealed as the list expands. Then, if the list collides with a virtual or real object in the environment as it expands, the list may adapt to the object as described above. In other implementations, instead of expanding from an origin, a list may be initially displayed in a fully expanded and topologically adapted form, rather than via an animated expansion.

Prior to displaying dynamically adaptable virtual lists in a 3D virtual or augmented reality environment, the display device 102 may create or otherwise obtain a 3D map of the environment. For example, the display device 102 may utilize on-board sensors (e.g. one or more depth sensors, two-dimensional image sensors, global positioning system sensors, motion sensors, and other sensors) to construct a topological map of the real-world environment via simultaneous localization and mapping (SLAM) as the user 104 moves within the environment. Alternatively or in addition to such real-time mapping, the display device 102 may retrieve from computer-readable memory a previously-constructed topological map of the real-world environment. In either case, the topological map may take the form of a mesh (e.g. a 'surface reconstruction' (SR) mesh, or may take any other suitable form. The 3D representations of dynamically adaptable virtual lists may then be displayed as adapting to the topology of the map, as well as to displayed virtual content.

Various actions may change the positional relationship between a displayed list and the real and/or virtual objects within the environment. Examples include, but are not limited to, changing a position and/or orientation of the display device, changing the 3D environment (e.g. by moving real objects in the environment), interacting with the list (e.g. by scrolling or selecting items in the list), and/or any other occurrence affecting the presentation of the list. In such instances, the displayed representation of the list may adapt to the changed positional relationship in the manner described herein.

Figure 3A:
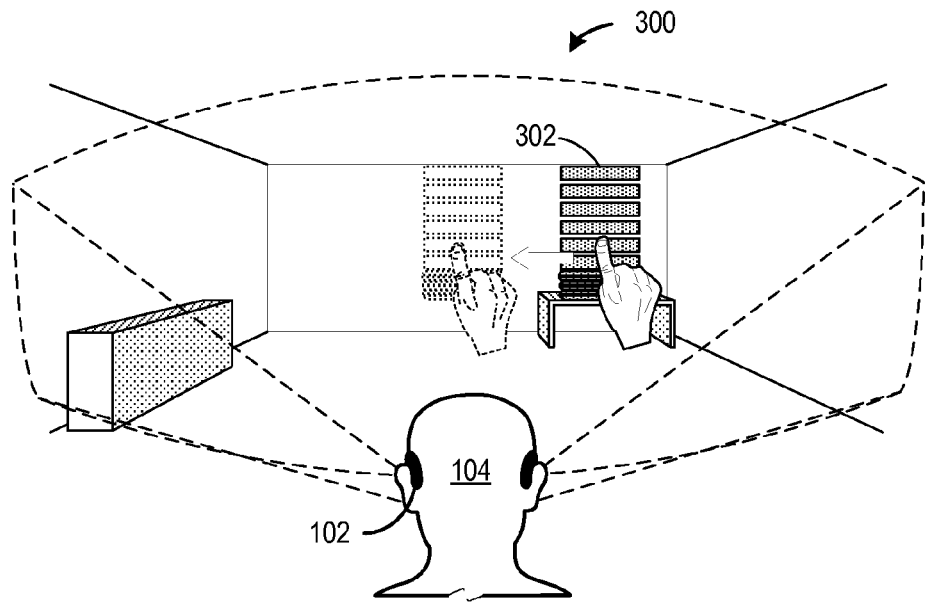
FIGS. 3A and 3B show an example user interaction with an example dynamically adaptable virtual list.
Figure 3B:
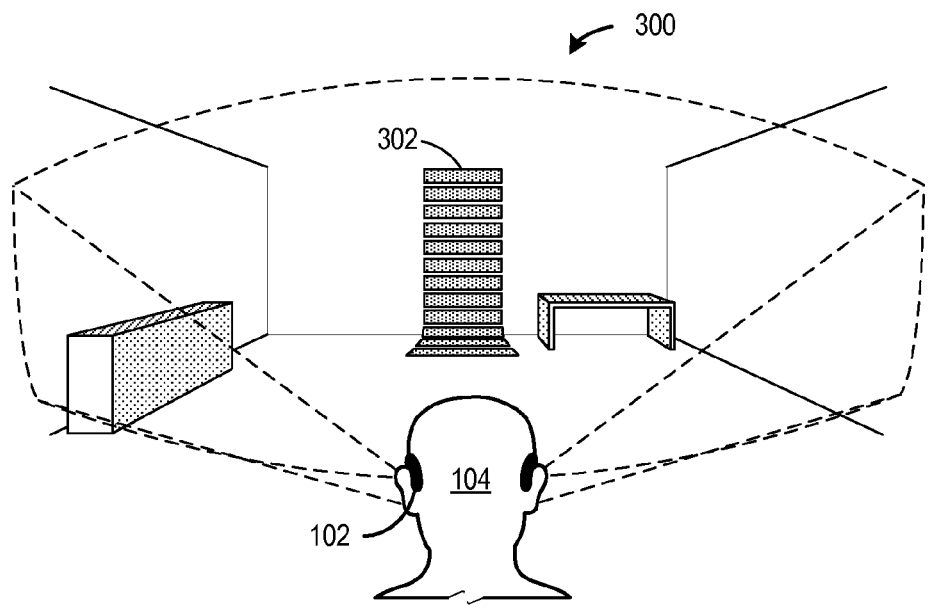

FIGS. 3A and 3B illustrate one example of the adaption of a list in response to an example user interaction. First referring to FIG. 3A, the user 104 makes a user input requesting a change in position of a dynamic virtual list 302. The user input is shown as a hand gesture, though it will be understood that any other suitable user input mechanism may be used, including but not limited to speech commands, eye gaze tracking, body gesture tracking (e.g. head gesture), and hand-operated hardware input devices (e.g. buttons, joysticks, directional pads, touch sensors, etc.).

In FIG. 3A, a portion of the list 302 is shown as folded where the list collides with a table in the 3D environment. FIG. 3B shows the dynamic virtual list 302 after it has been moved along the back wall to a position where the list no longer collides with the table. In this position, the previously folded portion of the list unfolds while still respecting the topology of the environment. For example, items that meet the floor near the bottom of the dynamic virtual list 302 are displayed as laid out onto the floor. Further, those items of the list which were initially folded are revealed for viewing and interaction.

Figure 4A:
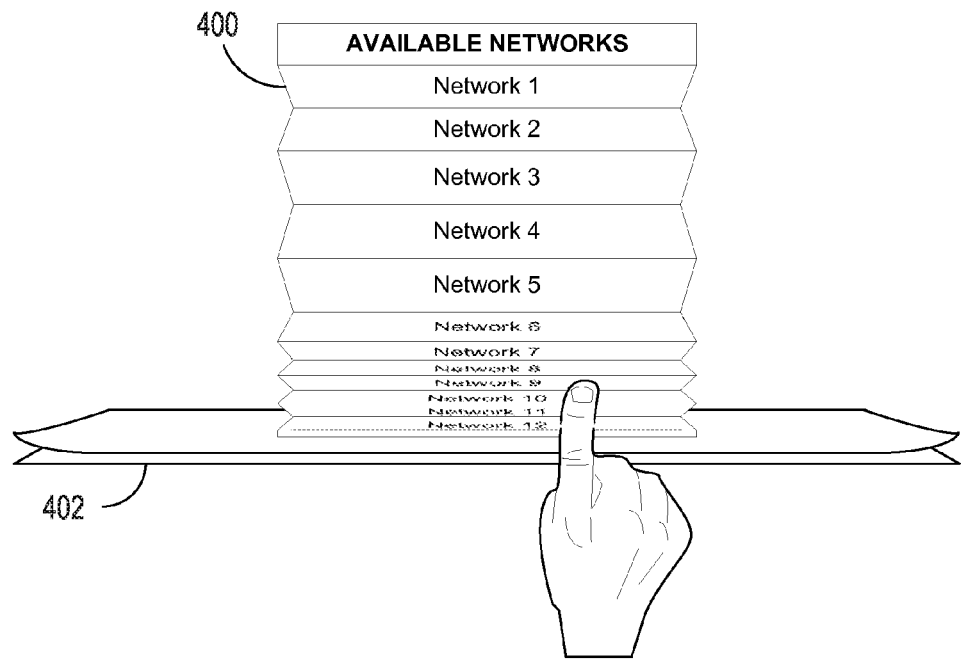
FIGS. 4A and 4B show another example user interaction with an example dynamically adaptable virtual list.
Figure 4B:
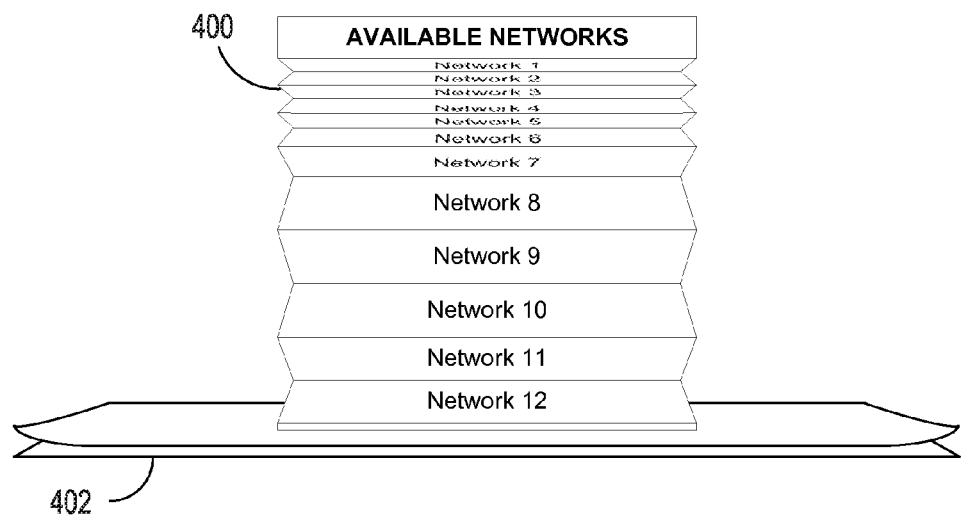

FIGS. 4A and 4B illustrate another example user interaction with a virtual list. In FIG. 4A, a virtual list 400 collides with an object 402, and items in the virtual list 400 are displayed as folding against the object 402 in response. The appearance of the folded portion of the virtual list 400 may be configured to represent the number of items of the list in that portion of the list. FIG. 4A also shows a user interacting with the folded portion, e.g. via a hand gesture. In response to this user interaction, the previously folded items in the virtual list 400 are unfolded, while other items in the list are folded to accommodate the spatial constraint imposed by the object 402, as shown in FIG. 4B. It will be understood that the items of the list that are hidden by folding in FIG. 4A may be revealed in any other suitable manner. For example, the folded portion of the list may unfold by draping over the object 402 and continuing downward (not shown).

Figure 5:
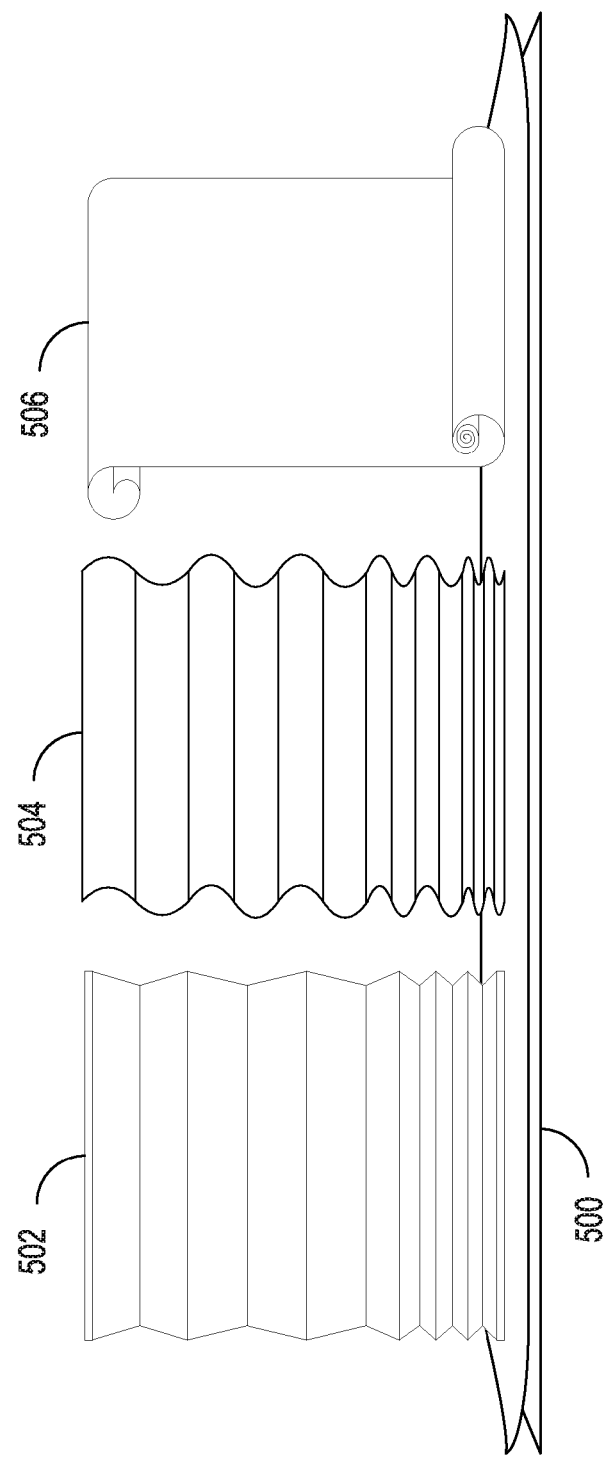
FIG. 5 shows examples of dynamically adaptable virtual lists adapting to an object.

In the example of FIGS. 4A-4B, the virtual list 400 compresses in a folded, accordion-like manner, but may compress or adapt differently in other examples. Further, the manner in which the virtual list adapts may be based upon physical properties of a real-world material from which the virtual list appears to be made. FIG. 5 shows examples of various forms of virtual lists and how they may adapt to an object 500. A first example list 502 is shown as folding in an accordion style similar to that of the example list of FIG. 4. Accordingly, the physical appearance of the virtual list 502 may correspond to that of a material that may fold similarly, wood planks, metal sheets, or other rigid materials. As another example, a list 504 may have a soft or cloth-like appearance. Such a list 504 may appear to wrinkle or fold against the object 500 as would cloth. As yet another example, a virtual list 506 may roll or curl up at the object 500, as if it were a scroll. In yet other examples, list items may be displayed as leaves on a vine, or in other organic forms. A text-based list may have any suitable appearance.

Further, in some implementations, a list may adapt to virtual and real objects with which it collides based upon a physical property associated with the items in the list. For example, where items in a list represent real-world objects, such as document pages, images in a photo album, stacks of books, record albums, articles of clothing, food items in a grocery shopping list, etc., the representations of the list items may physically appear and be arranged analogous to similar real-world objects. For example, a virtual list of paint samples may unfold along a wall as if the list were a physical stack of paint sample chips, and/or a virtual list of flooring tiles may unfold across a floor as if the list were a physical stack of tiles.

In some examples, the display of a dynamically adaptable virtual list may further take into account the physical properties of objects in the real world environment, in addition to the 3D topology of the environment. For example, a display device may be configured to acquire two-dimensional image data of the real world, and determine surface properties such as color, brightness, surface texture, material, phase (e.g. solid or liquid), etc. for real-world objects detected in the image data. The identified surfaces may be matched with objects the topology of the environment based upon the locations of the identified surfaces compared to the map of the 3D environment, and a dynamically adaptable virtual list may be displayed in a manner based upon the detected physical properties. As one example, a list that traverses a solid countertop, a sink filled with water, and then additional solid countertop may be displayed such that the portion of the virtual list traversing the sink appears to bob in the water. As another example, a virtual list may be displayed as expanding (e.g. unfolding) more slowly over a rough or sticky surface compared to expanding on a smooth or slippery surface. Other physical factors in the environment also may be taken into account. As some non-limiting examples, a virtual list may be displayed as vibrating in response to music (e.g. as detected via one or more microphones) if the list is proximate to or draped over the speaker, or blowing in the breeze if an increase in wind speed is detected (e.g. from a sound of wind as detected by microphone, from image data capturing other objects adapting to the wind, etc.).

FIG. 6 shows a flow diagram depicting an example method 600 for displaying a dynamic virtual list in a 3D environment. Method 600 comprises, at 602, detecting a trigger for display of a list, and in response, at 604, generating a representation of the list. The trigger may comprise any suitable input or event, including but not limited to user inputs, environmental sensor inputs, and application-triggered events.

The list may be generated in any suitable manner. For example, generating the representation of the list may comprise comparing the representation of the list to a topology of the 3D environment to determine whether any portion of the list representation intersects any virtual or real object in the topology, as indicated at 606. If one or more items of the representation of the list intersects an object in the topology of the 3D environment, then method 600 comprises, at 608, adjusting the representation of the list based upon the topology. Adjusting the representation of the list may comprise, at 610, adjusting one or more of a position and orientation of each of the one or more items of the representation of the list to adapt to the topology. As non-limiting examples, the list may compress (fold, bend, wrinkle, etc.) where the list collides with the virtual or real object, may change position and/or orientation to follow the contour of the object, and/or may adapt in any other suitable manner. Adjusting the list based upon the topology also may comprise, at 612, adjusting the list based upon one or more physical properties of real world objects as determined from image data, as indicated at 612. Such properties may include, but are not limited to, a color, brightness, surface texture, and phase of matter of a real world surface and/or object.

Method 600 further comprises, at 614, displaying the representation of the list. The representation of the list may be displayed in any suitable manner. For example, displaying the representation of the list may include, at 616, expanding the representation of the list from an origin (e.g. by animating the list falling open from the origin) toward the object, then adapting to the object when the representation of the list collides with the object in the 3D environment. In such an example, all items in the representation of the list may be displayed during at least a portion of the expansion of the list, which may help to provide information regarding the size and content of the list. In other examples, the list is initially displayed in full, rather than as expanding from an origin.

Upon colliding with the object, the list may be displayed as compressing against the object. Displaying the list as compressing against the object may comprise, for example, displaying one or more items of the list in a folded, bunched, or rolled representation, as shown at 618, or in any other suitable compressed state. The compressed portion of the list may have a size that indicates a number of list items contained within the compressed portion. In addition to or alternatively to compressing against the object, one or more list items may be displayed as changing direction and/or orientation to conform to the surface topology of the object, as indicated at 620. In this manner, occlusion of the list by the object may be avoided, which may help to reduce an error rate of user interactions with the list.

As mentioned above, at times various actions may occur that change a position of the list to an adjusted position from a user's perspective, as shown at 622. When such changes occur, method 600 may return to 604 to generate the representation of the list based upon the changed relationship between the list and the objects in the 3D environment. In this manner, the list dynamically adapts to the 3D environment in which it is displayed, until display of the list is ceased. It will be understood that the position, orientation, and/or appearance of the representation of the list may be adjusted in response to any suitable trigger, including but not limited to a user input interacting with the list (e.g. moving the list, scrolling through the list, etc.), a change in position and/or orientation of the display device, a change in the 3D environment, a programmatic trigger, etc.

FIG. 7 shows a block diagram of an example augmented reality display system 700. Display system 700 includes one or more lenses 702 that form a part of a see-through display subsystem 704, such that images may be displayed via lenses 702 (e.g. via projection onto lenses 702, waveguide system(s) incorporated into lenses 702, and/or in any other suitable manner). Display system 700 further includes one or more outward-facing image sensors 706 configured to acquire images of a real-world environment being viewed by a user, and may include one or more microphones 708 configured to detect sounds, such as voice commands from a user or ambient sounds. Outward-facing image sensors 706 may include one or more depth sensor(s) and/or one or more two-dimensional image sensor(s) (e.g. RGB image sensors). In other examples, augmented reality display system 700, may display augmented reality images via a viewfinder mode for an outward-facing image sensor, rather than via a see-through display subsystem.

Display system 700 may further include a gaze detection subsystem 710 configured to detect a gaze of a user for detecting user input interacting with displayed virtual lists and objects, for example when display system 300 is implemented as a head-mounted display system, as mentioned above. Gaze detection subsystem 710 may be configured to determine gaze directions of each of a user's eyes in any suitable manner. For example, in the depicted embodiment, gaze detection subsystem 310 comprises one or more glint sources 712, such as infrared light sources configured to cause a glint of light to reflect from each eyeball of a user, and one or more image sensor(s) 714, such as inward-facing sensors, configured to capture an image of each eyeball of the user. Changes in the glints from the user's eyeballs and/or a location of a user's pupil as determined from image data gathered via the image sensor(s) 714 may be used to determine a direction of gaze. Further, a location at which gaze lines projected from the user's eyes intersect the external display may be used to determine an object at which the user is gazing (e.g. a displayed virtual object and/or real background object). Gaze detection subsystem 710 may have any suitable number and arrangement of light sources and image sensors. In other examples, gaze detection subsystem 710 may be omitted.

Display system 700 also may include additional sensors, as mentioned above. For example, display system 700 may include non-imaging sensor(s) 716, examples of which may include but are not limited to an accelerometer, a gyroscopic sensor, a global positioning system (GPS) sensor, and an inertial measurement unit (IMU). Such sensor(s) may help to determine the position, location, and/or orientation of the display device within the environment, which may help provide accurate 3D mapping of the real-world environment for use displaying lists appropriately in an augmented reality setting.

Motion sensors, as well as microphone(s) 708 and gaze detection subsystem 710, also may be employed as user input devices, such that a user may interact with the display system 700 via gestures of the eye, neck and/or head, as well as via verbal commands. It will be understood that sensors illustrated in FIG. 7 are shown for the purpose of example and are not intended to be limiting in any manner, as any other suitable sensors and/or combination of sensors may be utilized.

Display system 700 further includes one or more speaker(s) 718, for example to provide audio outputs to a user for user interactions. Display system 700 further includes a controller 720 having a logic subsystem 722 and a storage subsystem 724 in communication with the sensors, gaze detection subsystem 710, display subsystem 704, and/or other components. Storage subsystem 724 comprises instructions stored thereon that are executable by logic subsystem 722, for example, to receive and interpret inputs from the sensors, to identify location and movements of a user, to identify real objects in an augmented reality field of view and present augmented reality imagery therefore, to detect objects located outside a field of view of the user, and to present indications of positional information associated with objects located outside the field of view of the user, among other tasks.

Logic subsystem 722 includes one or more physical devices configured to execute instructions. For example, the logic subsystem may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic subsystem may include one or more processors configured to execute software instructions. Additionally or alternatively, the logic subsystem may include one or more hardware or firmware logic subsystems configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely accessible, networked computing devices configured in a cloud-computing configuration.

The storage subsystem 724 includes one or more physical devices configured to hold instructions executable by the logic subsystem to implement the methods and processes described herein. When such methods and processes are implemented, the state of the storage subsystem 724 may be transformed—e.g., to hold different data.

The storage subsystem 724 may include removable and/or built-in devices. The storage subsystem 724 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage subsystem 724 may include volatile, nonvolatile, dynamic, static, read/write, read-only, random-access, sequential-access, location-addressable, file-addressable, and/or content-addressable devices.

It will be appreciated that the storage subsystem 724 includes one or more physical devices. However, aspects of the instructions described herein alternatively may be propagated by a communication medium (e.g., an electromagnetic signal, an optical signal, etc.) that is not held by a physical device for a finite duration.

Aspects of the logic subsystem 722 and the storage subsystem 724 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The see-through display subsystem 704 may be used to present a visual representation of data held by storage subsystem 724. This visual representation may take the form of a graphical user interface (GUI) comprising lists and/or other graphical user interface elements. As the herein described methods and processes change the data held by the storage subsystem, and thus transform the state of the storage subsystem, the state of see-through display subsystem 704 may likewise be transformed to visually represent changes in the underlying data. The see-through display subsystem 704 may include one or more display devices utilizing virtually any type of technology. Such display devices may be combined with the logic subsystem 722 and/or the storage subsystem 724 in a shared enclosure, or such display devices may be peripheral display devices.

The communication subsystem 726 may be configured to communicatively couple the display system 700 with one or more other computing devices. The communication subsystem 726 may include wired and/or wireless communication devices compatible with one or more different communication protocols. As non-limiting examples, the communication subsystem 726 may be configured for communication via a wireless telephone network, or a wired or wireless local- or wide-area network. In some embodiments, the communication subsystem 726 may allow display system 700 to send and/or receive messages to and/or from other devices via a network such as the Internet.

It will be appreciated that the depicted display system 700 is described for the purpose of example, and thus is not meant to be limiting. It is to be further understood that the display system may include additional and/or alternative sensors, cameras, microphones, input devices, output devices, etc. than those shown without departing from the scope of this disclosure. For example, the display system 700 may be implemented as a virtual realty display system rather than an augmented reality system. Additionally, the physical configuration of a display device and its various sensors and subcomponents may take a variety of different forms without departing from the scope of this disclosure. Further, it will be understood that the methods and processes described herein may be implemented as a computer-application program or service, an application-programming interface (API), a library, and/or other computer program product. Such computer program products may be executable locally on the display system 700 or other suitable display system, or may be executable remotely on a computing system in communication with the display system 700.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

Another example provides a computing device comprising an image sensor configured to acquire image data, a display device, a logic device configured to execute instructions, and a storage device comprising instructions executable by the logic device to detect a trigger for display of a list, in response to the trigger, generate a representation of the list, compare the representation of the list to a topology of a three-dimensional environment viewable via the display device to determine whether the representation of the list intersects any object in the topology, if the representation of the list intersects an object in the topology of the three-dimensional environment, then adjust one or more of a position and orientation of each of one or more items of the list to adapt to the object in the topology, and display the representation of the list via the display. In this example, the object in the topology of the three-dimensional environment may additionally or alternatively include one or more of a virtual object and a real-world object. The instructions may additionally or alternatively be executable by the logic device to display the representation of the list as adapting to the object by displaying the representation of the list as expanding toward the object, then displaying the representation of the one or more items of the list as compressing against the object. The instructions may additionally or alternatively be executable to display the representation of the one or more items of the list as compressing against the object by displaying the representation of the one or more items of the list in one or more of a folded representation, a bunched representation, and a rolled representation. The instructions may additionally or alternatively be executable to display the representation of the one or more items of the list as compressing against the object by displaying a compressed portion of the list having an appearance representing a number of items in the compressed portion of the list. The instructions may additionally or alternatively be executable to display the representation of the list as adapting to the object by adjusting the representation of the list to follow a surface contour of the object. The image sensor may additionally or alternatively comprise a two-dimensional camera, and wherein the instructions are executable to acquire two-dimensional image data of the 3D environment, and to identify a property of a real-world surface corresponding to a real-world object in the topology of the 3D environment. The instructions may additionally or alternatively be executable to adjust the representation of the list based upon the property of the real-world surface. The computing device may additionally or alternatively include an input device, and wherein the instructions are further executable to receive a user input moving the list on the display to an adjusted position, and in response adjust one or more of the position and the orientation of the representation of the one or more items of the list based upon an intersection of the list with the topology at the adjusted position.

Another example provides, on a computing device, a method of displaying a user interface, the method comprising detecting a trigger for display of a list, in response to the trigger, generating a representation of the list, comparing the representation of the list to a topology of the three-dimensional environment to determine whether one or more items of the representation of the list intersects any object in the topology, if one or more items of the representation of the list intersects an object in the topology of the three-dimensional environment, then adjusting one or more of a position and orientation of each of the one or more items of the representation of the list to adapt to the object in the topology, and displaying the representation of the list. In this example, the object in the topology of the three-dimensional environment may additionally or alternatively include one or more of a virtual object and a real-world object. The method may additionally or alternatively include displaying the representation of the list by displaying the representation of the list as expanding from an origin toward the object, then compressing against the object. The method may additionally or alternatively include displaying the representation of the list as compressing against the object by displaying each of the one or more items in one or more of a folded representation, a bunched representation, and a rolled representation. The method may additionally or alternatively include displaying the representation of the list as compressing against the object by displaying a compressed portion of the list having an appearance representing a number of items in the compressed portion of the list. The method may additionally or alternatively include displaying the representation of the list by displaying the one or more items of the representation of the list as following a surface contour of the object. The method may additionally or alternatively include acquiring two-dimensional image data of the 3D environment, and identifying a property of a real-world surface corresponding to a real-world object in the topology of the 3D environment. The method may additionally or alternatively include adjusting the representation of the list based upon the property of the real-world surface. In this example, the property may additionally or alternatively include one or more of a texture and a phase of matter of the real-world surface. The method may additionally or alternatively include receiving a user input moving the list on the display to an adjusted position, and in response adjusting one or more of the position and the orientation of the representation of the one or more items of the list based upon an intersection of the list with the topology at the adjusted position.

Another example provides a wearable augmented reality computing device comprising an image sensor configured to acquire image data of a real-world environment, a see-through display device through which at least a portion of the real-world environment is viewable, a logic device configured to execute instructions, and a storage device comprising instructions executable by the logic device to detect a trigger for display of a list, in response to the trigger, generate a representation of the list, compare the representation of the list to a topology representing the real-world environment and a virtual object displayed via the see-through display device to determine whether the representation of the list intersects any object in the topology, if the representation of the list intersects an object in the topology, then adjust one or more of a position and orientation of each of one or more items of the list to adapt to the object in the topology, and display the representation of the list via the see-through display device.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:
1. A computing device comprising:
an image sensor configured to acquire image data;
a near-eye display device configured to display holographic images;
a logic device configured to execute instructions; and
a storage device comprising instructions executable by the logic device to detect a trigger for display of a list;
in response to the trigger, generate a representation of the list for display as a holographic image of the list;
compare the representation of the list to data representing a three-dimensional map of a topology of a three-dimensional environment viewable via the display device to determine whether the representation of the list intersects any object in the three-dimensional map of the topology of the three-dimensional environment;

if the representation of the list intersects an object in the three-dimensional map of the topology of the three-dimensional environment, then adjust one or more of a position and orientation of each of one or more items of the list by performing one or more of bending and folding the representation of the list to adapt to the object in the three-dimensional map of the topology; and after performing the one or more of bending and folding the representation of the list, display the holographic image of the list via the near-eye display device as adapted to the object.

2. The computing device of claim 1, wherein the object in the topology of the three-dimensional environment comprises one or more of a virtual object and a real-world object.

3. The computing device of claim 1, wherein the instructions are executable to display the holographic image of the list as adapting to the object by displaying the holographic image of the list as expanding toward the object, then displaying the representation of the one or more items of the list as compressing against the object.

4. The computing device of claim 3, wherein the instructions are executable to display the holographic image of the list as compressing against the object.

5. The computing device of claim 3, wherein the instructions are executable to display the holographic image of the list as compressing against the object by displaying a compressed portion of the list having an appearance representing a number of items in the compressed portion of the list.

6. The computing device of claim 1, wherein the instructions are executable to display the holographic image of the list as adapting to the object by adjusting the representation of the list to follow a surface contour of the object.

7. The computing device of claim 1, wherein the image sensor comprises a two-dimensional camera, and wherein the instructions are executable to acquire two-dimensional image data of the three-dimensional environment, and to identify a property of a real-world surface corresponding to a real-world object in the topology of the three-dimensional environment.

8. The computing device of claim 7, wherein the instructions are further executable to adjust the representation of the list based upon the property of the real-world surface.

9. The computing device of claim 1, further comprising an input device, and wherein the instructions are further executable to receive a user input moving the list to an adjusted position, and in response adjust one or more of the position and the orientation of each of the one or more items of the list based upon an intersection of the list with the topology at the adjusted position.

10. On a computing device comprising a near-eye display configured to display holographic images, a method of displaying a user interface, the method comprising:

detecting a trigger for display of a list;

in response to the trigger, generating a representation of the list;

comparing the representation of the list to a topology of the three-dimensional environment to determine whether one or more items of the representation of the list intersects any object in the topology; and if one or more items of the representation of the list intersects an object in the topology of the three-dimensional environment, then displaying an animation of the representation of the list as one or more of folding and bending at the object in the topology.

11. The method of claim 10, wherein the object in the topology of the three-dimensional environment comprises one or more of a virtual object and a real-world object.

12. The method of claim 10, wherein displaying the animation of the representation of the list comprises displaying the representation of the list as expanding from an origin toward the object, then compressing against the object.

13. The method of claim 12, wherein displaying the animation of the representation of the list as compressing against the object comprises displaying each of the one or more items in one or more of a folded representation, a bunched representation, and a rolled representation.

14. The method of claim 12, wherein displaying the animation of the representation of the list as compressing against the object comprises displaying a compressed portion of the list having an appearance representing a number of items in the compressed portion of the list.

15. The method of claim 10, wherein displaying the animation of the representation of the list comprises displaying the one or more items of the representation of the list as following a surface contour of the object.

16. The method of claim 10, further comprising acquiring two-dimensional image data of the three-dimensional environment, and identifying a property of a real-world surface corresponding to a real-world object in the topology of the three-dimensional environment.

17. The method of claim 16, further comprising adjusting the representation of the list based upon the property of the real-world surface.

18. The method of claim 16, wherein the property comprises one or more of a texture and a phase of matter of the real-world surface.

19. The method of claim 10, further comprising receiving a user input moving the list to an adjusted position, and in response adjusting one or more of the position and the orientation of the representation of the one or more items of the list based upon an intersection of the list with the topology at the adjusted position.

20. A wearable augmented reality computing device, comprising:

an image sensor configured to acquire image data of a real-world environment;

a see-through display device through which at least a portion of the real-world environment is viewable, the see-through display device configured to display holographic images;

a logic device configured to execute instructions; and a storage device comprising instructions executable by the logic device to detect a trigger for display of a list;

in response to the trigger, generate a representation of the list for display as a holographic image of the list;

compare the representation of the list to data representing a three-dimensional map of a topology representing the real-world environment and a virtual object displayed via the see-through display device to determine whether the representation of the list intersects any object in three-dimensional map of the topology representing the real-world environment;

if the representation of the list intersects an object in the three-dimensional map of the topology, then adjust one or more of a position and orientation of each of one or more items of the list by performing one or more of bending and folding the representation of the list to adapt to the object in the three-dimensional map of the topology; and after performing the one or more of bending and folding the representation of the list, display the holographic image of the list via the see-through display device as adapted to the object.

\* \* \* \* \*